United States Patent [19]

Pivawer

[11] 3,923,844
[45] Dec. 2, 1975

[54] PROCESS FOR THE PREPARATION OF 4,4,4-TRICHLORO-1,2-EPOXYBUTANE

[75] Inventor: Philip M. Pivawer, Hamden, Conn.

[73] Assignee: Olin Corporation, New Haven, Conn.

[22] Filed: July 29, 1974

[21] Appl. No.: 492,576

[52] U.S. Cl. ............................................ 260/348.6
[51] Int. Cl.² ..................................... C07D 301/26
[58] Field of Search ................................. 260/348.6

[56] References Cited
UNITED STATES PATENTS
3,399,217   8/1968   Zaslowsky ...................... 260/348 R FOREIGN PATENTS OR APPLICATIONS
1,017,978   1/1966   United Kingdom
2,153,892   5/1972   Germany Primary Examiner—Norma S. Milestone
Attorney, Agent, or Firm—F. A. Iskander; T. P. O'Day

[57] ABSTRACT

The dehydrohalogenation of 2-halo-4,4,4-trichlorobutanol to 4,4,4-trichloro-1,2-epoxybutane is carried out in the presence of selected anti-oxidants in order to reduce or prevent emulsion formation. The trichloroepoxybutane product is a useful intermediate in the production of flame retardant polyurethane foam.

13 Claims, No Drawings

PROCESS FOR THE PREPARATION OF 4,4,4-TRICHLORO-1,2-EPOXYBUTANE

This invention relates to an improved process for making 4,4,4-trichloro-1,2-epoxybutane.

The compound 4,4,4-trichloro-1,2-epoxybutane, hereinafter referred to as TCBO, is a valuable chemical which is particularly useful in preparing flame retardant materials. It can be employed as a plasticizer for polymeric materials, and it is highly useful as a chemical intermediate to modify the properties of active hydrogen-containing organic materials by reaction therewith. Illustrative of the latter application is the reaction of TCBO with polyhydroxy materials to provide chlorinated polyether polyols which are useful in preparing flame retardant polyurethane foam. See U.S. Pat. No. 3,741,921.

A well-known prior art process for preparing TCBO comprises reacting 2-halo-4,4,4-trichlorobutanol with an aqueous solution of a basic dehydrohalogenating agent. A reaction product mixture is thus obtained consisting essentially of a two-phase system, namely, a light aqueous phase containing used dehydrohalogenation agent and a heavier organic phase which is essentially TCBO. The TCBO is then recovered from the mixture by phase separation. By virtue of the high yields of TCBO that it provides, this prior art process is of potential utility in the commercial production of TCBO.

However, it has recently been found that the dehydrohalogenation of 2-halo-4,4,4-trichlorobutanol in the presence of water is plagued with one drawback. Almost invariably this reaction results in the formation of an emulsion which takes hours, and quite often days, to subside. This emulsion formation, a phenomenon the causes of which are not fully known, materially hinders the phase separation operation for the recovery of TCBO. Thus a considerable lag or delay time must be allowed to elapse, after completion of the dehydrohalogenation reaction, in order for the emulsion to subside to a level that would enable the phase separation operation to be efficiently carried out. Consequently, various production and processing equipment must be kept idle during this lag time, which of course adds to the cost of TCBO manufacture.

The principal object of the invention is to provide an improved process for the aqueous dehydrohalogenation of 2-halo-4,4,4-trichlorobutanol, wherein emulsion formation is substantially reduced or eliminated thereby enabling the recovery of TCBO immediately after the dehydrogenation reaction is completed.

In accordance with the invention, the above object is achieved by carrying out the dehydrohalogenation reaction in the presence of selected anti-oxidants. These anti-oxidants, which are described in detail hereinbelow, have been found to act as effective emulsion inhibitors in this type of reaction without otherwise interfering with the dehydrohalogenation or adversely affecting the product and yield thereof.

The dehydrohalogenation reaction for the preparation of TCBO proceeds in accordance with the following equation in which X is a halogen.

The preferred butanols for use in the dehydrohalogenation reaction are 2,4,4,4-tetrachlorobutanol and 2-bromo-4,4,4-trichlorobutanol, i.e., where X in the above equation represents chlorine or bromine.

Any suitable basic dehydrohalogenating agent, which is water-soluble, may be employed in carrying out the reaction. A variety of such materials are available such as the hydroxides, carbonates and oxides of the alkali metals and the alkaline earth metals. However, it is preferred to employ an alkali metal hydroxide, such as sodium, potassium, lithium, rubidium and cesium hydroxide, or an alkaline earth metal hydroxide such as calcium, magnesium, and barium hydroxide. The more preferred alkali metal hydroxides are sodium and potassium hydroxide, and the more preferred alkaline earth metal hydroxide is calcium hydroxide, sodium and potassium hydroxide being most preferred.

The basic dehydrohalogenating agent is used in the form of an aqueous solution thereof. The concentration of this solution may be varied over a reasonably wide range. In actual practice, however, a concentration ranging from about 1 to about 50, and preferably about 2-20, percent by weight is used.

Although any suitable proportion of the dehydrohalogenating agent solution may be used, it is generally preferred to employ such a proportion as to provide at least the stoichiometric amount which is required to react with the 2-halo-4,4,4-trichlorobutanol. In accordance with the preferred embodiments of the invention, a small stoichiometric excess of the dehydrohalogenation agent is used, such as about 1.1–1.5 times the amount which is stoichiometrically required to react with the 2-halo-4,4,4-trichlorobutanol.

If desired the reaction may be carried out in the presence of an inert organic solvent, which is stripped off from the organic phase after the reaction is completed. However, for reasons of economy and simplified procedure, it is generally preferred to carry out the reaction in the absence of organic solvents.

In accordance with the invention, the dehydrohalogenation reaction is carried out in the presence of a select anti-oxidant which is effective in inhibiting or substantially reducing the formation of emulsion. While any such anti-oxidant may be used according to the invention, it has been found that the alkali metal bisulfites, catechol, and 4-alkyl catechol are particularly effective for this purpose. The alkali metal bisulfites are exemplified by sodium, potassium, lithium, rubidium and cesium bisulfite, the bisulfites of sodium and potassium being particularly preferred. The alkyl group in the 4-alkyl catechol usually contains 1–8, and preferably 1–4, carbon atoms. Illustrative such catechol derivatives include 4-methyl catechol, 4-ethyl catechol, 4-isopropyl catechol, 4-tertiarybutyl catechol, 4-n-octyl catechol and 4-tertiaryoctyl catechol.

The anti-oxidant may be used in any suitable proportion which is effective in inhibiting or reducing emulsion formation without adversely affecting the reaction or the product thereof. Thus an emulsion inhibiting proportions is used. For example, such a proportion may range from about 0.05 to about 5, and preferably about 0.1–2.0, parts per every 100 parts by weight of

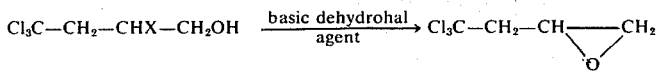

the 2-halo-4,4,4-trichlorobutanol. It is to be understood, however, that proportions outside these ranges may be employed if desired; and the term "emulsion-inhibiting proportion," as used in the specification and claims herein, is intended to encompass any suitable proportion which is effective in at least reducing or at best completely inhibiting the formation of an emulsion. In accordance with the most preferred embodiment of the invention, a proportion of anti-oxidant is used which ranges from about 0.2 to about 1.4 parts per every 100 parts by weight of the 2-halo-4,4,4-trichlorobutanol.

The dehydrohalogenation reaction may be effected at any suitable temperature such as from about 20 to about 100°C. The preferred temperature range is about 30°–80°C, and in actual practice a more preferred range of about 40°–65°C is used. The pressure under which the reaction is carried out is not critical. Thus any suitable pressure may be used. However, for reasons of economy and convenience, atmospheric pressure is preferably employed.

In practicing the process of the invention, any convenient order of mixing the reactants and anti-oxidant may be employed. For example, the anti-oxidant and the 2-halo-4,4,4-trichlorobutanol may be separately or individually added to, and mixed with, a prepared solution of the dehydrohalogenating agent; or alternatively, in accordance with a preferred embodiment of the invention, the antioxidant may be mixed with the butanol or with the dehydrohalogenating agent solution before the two reactants are brought together.

When the dehydrohalogenation reaction is completed, a two-phase reaction product mixture is obtained which consists of a lower TCBO phase and an upper aqueous phase containing the anti-oxidant and the dehydrohalogenating agent. The recovery of TCBO is then achieved by phase separation which can be performed easily and without delay. Thus obtained the TCBO product may, if desired, be subjected to conventional purification operations, such as distillation, if a highly purified product is desired. Otherwise, the TCBO product, as recovered by phase separation, can be employed as is in the production of chlorinated polyether polyols for use in the production of flame retardant polyurethane foams.

The following examples are provided to illustrate the invention. In these examples all parts and percentages are by weight unless otherwise specified.

EXAMPLE 1

In a laboratory-scale glass reactor equipped with a mechanical agitator and a thermometer, 82.9 grams of sodium hydroxide were dissolved in 1,024 grams of water. While maintaining the content of the reactor in constant agitation and at a temperature of 62°–65°C. 387 grams of 2,4,4,4-tetrachlorobutanol, to which had been added 3 grams of 4-tertiarybutyl catechol, were rapidly added over a period of one minute. The stirred mixture was maintained at the above temperature for an additional 10 minutes, and then it was poured into a separatory funnel. Two clear layers free of emulsion immediately formed, namely, a light aqueous layer containing the anti-oxidant and the dehydrohalogenation agent, and a lower organic layer. The layers were separated and the presence of TCBO in the organic phase was verified by vapor phase chromatography.

COMPARISON 1

The identical procedure of Example 1 was followed but without using 4-tertiarybutyl catechol or any other anti-oxidant. On placing the reaction product mixture in a separatory funnel, a small aqueous layer did rise to the top and separate. However, the lower layer was completely emulsified and the recovery of water-free TCBO by phase separation could not be readily carried out. Furthermore, at the end of 24-hours setting time, the emulsion had not subsided to a noticeable degree.

EXAMPLE 2

The identical procedure of Example 1 was followed with one variation. This is that instead of mixing 3 grams of 4-tertiarybutyl catechol with 2,4,4,4-tetrachlorobutanol, 3 grams of sodium bisulfite were mixed in with the aqueous caustic solution before the addition of 2,4,4,4-tetrachlorobutanol thereto. Substantially the same result of Example 1 was observed.

EXAMPLE 3

This example was carried out following the procedure of Example 2, except that 5 grams of catechol were used instead of 3 grams of 4-tertiarybutyl catechol. Again substantially the same result obtained.

EXAMPLE 4

The procedure of Example 1 was followed using, instead of 3 grams, only 0.7 grams of 4-tertiarybutyl catechol. A noticeable emulsion was noted in the organic phase that resulted, although it was evident that even at this level, the presence of the catechol derivative resulted in substantial reduction of the emulsion as compared with Comparison 1.

EXAMPLES 5–6

In these examples, the procedure of Example 4 was followed using the same reduced level of anti-oxidant which in Example 5 was sodium bisulfite and catechol in Example 6. In each case, substantial reduction was observed as compared with the result of Comparison 1 where no anti-oxidant at all was used.

What is claimed is:

1. In a process for preparing 4,4,4-trichloro-1,2-epoxybutane which comprises reacting 2,4,4,4-tetrachlorobutanol or 2-bromo-4,4,4-trichlorobutanol with an aqueous solution of basic dehydrohalogenating agent selected from the group consisting of an alkali metal hydroxide and an alkaline earth metal hydroxide, the improvement wherein said reaction is carried out in the presence of an emulsion-inhibiting proportion of an anti-oxidant selected from the group consisting of an alkali metal bisulfite, catechol and 4-alkyl catechol in which said alkyl group contains from 1 to 8 carbon atoms.

2. The process of claim 1 wherein said alkali metal bisulfite is sodium bisulfite and said alkyl group is tertiarybutyl.

3. The process of claim 1 wherein said alkali metal hydroxide is sodium hydroxide or potassium hydroxide and said alkaline earth metal hydroxide is calcium hydroxide.

4. The process of claim 3 wherein said 2,4,4,4-trichlorobutanol is employed.

5. The process of claim 4 wherein said aqueous solution is used in such a proportion as to provide at least the stoichiometric amount of said basic dehydrohalogenating agent which is required to react with said 2,4,4,4,-tetrachlorobutanol.

6. The process of claim 5 wherein said aqueous solution has a concentration of said basic dehydrohalogenating agent ranging from about 2 to about 20 percent by weight.

7. The process of claim 6 wherein said reaction is carried out at a temperature of about 30°–80°C.

8. The process of claim 7 wherein said basis dehydrogenating agent is sodium hydroxide.

9. The process of claim 8 wherein said emulsion-inhibiting proportion ranges from about 0.2 to about 1.4 parts per every 100 parts by weight of said 2,4,4,4-tetrachlorobutanol.

10. The process of claim 9 wherein said reaction is carried out at atmospheric pressure and a temperature of about 40°–65°C.

11. The process of claim 10 wherein said aqueous solution is employed in such a proportion as to provide about 1.1–1.5 times the stoichiometric amount, of said sodium hydroxide, which is required to react with said 2,4,4,4-tetrachlorobutanol.

12. The process of claim 11 wherein said anti-oxidant is sodium bisulfite, catechol or 4-tertiarybutyl catechol.

13. The process of claim 12 wherein said anti-oxidant is sodium bisulfite.

\* \* \* \* \*